2,906,668
ZIRCONYL AND ALUMINUM HALOHYDROXY COMPLEX

Stewart M. Beekman, Berkeley Heights, N.J., assignor to Reheis Company, Inc., a corporation of New York No Drawing. Application June 13, 1955
Serial No. 515,250

9 Claims. (Cl. 167—90)

This invention relates to a complex of zirconyl and aluminum hydroxychloride and the method of making the complex.

The new complex is particularly useful as an astringent and for that reason will be first illustrated by description in connection with such use.

Zirconium oxychloride or zirconyl chloride, of the formula $ZrOCl_2$, has certain desirable properties in astringents for use on the skin as, for example, deodorizing effect. It is strongly acidic, however, and for that reason is not useful for such purposes as underarm deodorants or antiperspirants.

I have now found that I may correct the acidity of zirconium oxychloride and make a generally desirable astringent by forming a complex of the zirconium oxychloride and aluminum hydroxychloride. I have also discovered means of stabilizing aqueous compositions of the complex so that it retains satisfactorily its viscosity and also pH on aging.

Briefly stated, the invention comprises the herein described zirconyl and aluminum complex, the process of making it, and astringents and deodorants including the said complex. More specifically, the invention comprises a complex of zirconium oxychloride (or other halide) and aluminum hydroxychloride. In the commercial embodiment, the invention comprises such complex of composition that may be represented by the empirical formula $$ZrOCl_2 \cdot Al_n(OH)_{n(2-2.5)}(Cl)_{n(0.5-1)}$$

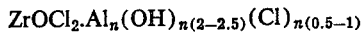

in which $n$ is a number within the range 2–10 and the numbers of OH groups and Cl atoms are so selected, within the ranges stated, that their total will be $3n$.

The invention includes also an astringent to be used on the human skin, the proportions of the several ingredients being so selected that the pH of a 20% solution of the final complex will be at least approximately 3.5.

The process of the invention comprises heating a zirconyl salt compound with a source of aluminum hydroxychloride or other hydroxyhalide, aluminum metal, and water until reaction is substantially complete.

Chlorine is the halogen ordinarily used in my composition.

When I first made the zirconyl and aluminum complex of the kind described, it was in the form of an aqueous solution of pH 1.8. This pH is not permissible in an astringent for human use. On standing overnight, the solution set to a gel. When it had stood for 9 months, the gel had again become liquid and the pH had risen to 3.8. The liquid composition since that time has remained substantially stable in both consistency and pH.

I have now discovered that I can produce this desired sol form of the complex with a stable viscosity and pH level suitable for astringent use by heating the solution of the complex as first made for a period of several hours or so.

As to materials, I use the zirconium oxychloride in commercial form, ordinarily octahydrate, hydrous carbonate of zirconia, or other zirconium oxyhalides.

As the source of the aluminum hydroxy halide, I may use a mixture of an aluminum halide, aluminum, and water. Ordinarily I use an aluminum hydroxychloride, as for example, any one of the commercial aluminum chlorhydroxy complexes now being offered for astringent and antiperspirant use. Thus I may use any one of the aluminum chlorhydroxy complexes described by Govett and De Navarre, American Perfumer, April 1947, or in U.S. Patent No. 2,196,016, issued to Huehn on April 2, 1940.

Instead of using the zirconium oxychloride and the aluminum hydroxychloride as the intermediates from which my new compounds are made, I may make my new zirconyl and aluminum complex from other less advanced raw materials. Thus, I may make the final complex by reaction of zirconium oxychloride with aluminum chloride and finely divided aluminum metal in contact with water, as at a temperature 70°–100° C. to increase the rate of reaction and promote the gel-sol transformation. Also, I may start with carbonated hydrous zirconia, aluminum chloride, aluminum powder, and water and react them at an elevated temperature to accelerate the reaction.

Water is ordinarily used as the liquid dispersing medium or solvent in making astringents and antiperspirants. Mixtures of water and alcohols such as ethanol and isopropanol may also be used.

The invention will be further illustrated by description in connection with the following examples of the practice of it. In these examples and elsewhere herein, proportions are expressed as parts by weight unless specifically stated to the contrary.

EXAMPLE 1

*Preparation of 40% solution of $ZrOCl_2 \cdot Al_8(OH)_{20}Cl_4$*

282 parts of zirconium oxychloride, represented by the formula $ZrOCl_2 \cdot 8H_2O$ and containing 40% of Zr calculated as $ZrO_2$, in 368 parts of water at room temperature were added slowly (in 3 minutes) and stirred with 1350 parts of a 50% solution of aluminum chlorhydroxy complex containing 5 OH groups to 1 Cl and containing 23.5% of Al calculated as $Al_2O_3$.

The reaction mixture immediately formed a gel.

Heat was applied and agitation continued. In the course of 30 minutes, the reaction temperature increased to 84° C. and the gel changed to an opalescent or cloudy liquid. Heating was continued. As the temperature rose to 95°, the reaction mixture became less cloudy. In 6 hours heating, the pH of the reaction product increased to 3.8 and the reaction mixture became very slightly opalescent. The heating was then discontinued, the batch allowed to cool, and additional water added to compensate for that lost during the heating.

The reaction product weighed 2000 parts. Analysis showed the following composition: Al as $Al_2O_3$, 16.47%; Zr as $ZrO_2$, 5.33%. The chlorine, calculated from the raw materials used, was about 8.6%. All these percentages are calculated on the wet basis of the product. At 20° C. the density of the product was 34.7° Bé. and the viscosity 13.5 cps.

The pH has not changed appreciably within about a month subsequent to the heating step and the viscosity also has remained substantially constant.

EXAMPLE 2

*Preparation of 20% solution of $ZrOCl_2 \cdot Al_8(OH)_{20}Cl_4$*

1652 parts of water were added to a glass-lined reactor followed by 471 parts of aluminum chloride solution (24° Baumé containing 97.6 parts of $AlCl_3$). 169 parts of zirconium oxychloride ZrOCl₂·8H₂O, containing 40% ZrO₂, were then dissolved in the aluminum chloride solution. The temperature of the material contained in the reactor was increased to 70° C. 98 parts of finely divided aluminum powder were added in small increments over a 2½ hour period during which time the reaction temperature ranged from 70° to 90° C. and a moderately high degree of agitation was maintained. The reaction was extremely exothermic and excess heat had to be removed by means of a water jacket. After the first half hour of reaction, the entire batch set up to a gel. After 15 minutes, most of the gel was dispersed and reverted to the sol form.

The reaction product before filtration weighed 2400 parts. Small amounts of unreacted aluminum and other impurities were removed by filtration. The final product had a density of 18.95° Baumé at 25° C. and a pH of about 3.8.

EXAMPLE 3

The complex is made as described in Example 2 except that the zirconium oxychloride is replaced by 1346 parts of the carbonated hydrous zirconia gel containing 5% ZrO₂. Other materials used were 714 parts of aluminum chloride solution (24.0° Baumé containing 146 parts AlCl₃), 89 parts of finely divided aluminum powder, and 251 parts of water.

EXAMPLE 4

Bromide and iodide complexes

To make the bromide or iodide complex, zirconium oxybromide or oxyiodide and aluminum bromide or iodide are substituted for chlorides, on an equimolecular weight basis, in Example 1.

EXAMPLE 5

Astringent composition 50 parts by volume of the final product of Example 1 (the zirconia and aluminum complex) were mixed with 10 parts of water by volume and 40 parts of ethanol Formula No. 30. The composition was found to be a very effective deodorant and antiperspirant when applied to the underarm area.

EXAMPLE 6

Astringent composition 50 parts by weight of the final product of Example 1 was diluted with 50 parts by weight of water. The resulting composition was an effective antiperspirant and deodorant.

The aqueous solutions made as described above, as, for instance, in Examples 1–4, may be reduced to dry form. Thus, they may be dried by passing dry air at a temperature of 120° F. over the surface of the wet material in the form of a thin layer, or by spray drying.

By varying the proportion of water in the preparations or by partial evaporation subsequent to the making of the final complex, the concentration of the solutions may be increased as, for instance, up to 50 parts or more of solids for 100 parts of the solution.

It will be understood that it is intended to cover all changes and modifications of the examples of the invention herein chosen for the purpose of illustration which do not constitute departures from the spirit and scope of the invention.

What I claim is:

1. In making a zirconyl and aluminum complex, the process which comprises forming an aqueous composition of a zirconyl compound selected from the group consisting of zirconyl chloride, bromide, iodide and hydrous carbonate and an aluminum hydroxy halide complex in proportion to provide 2–10 atoms of aluminum per mole of zirconyl compound, the said halide being selected from the group consisting of chloride, bromide, and iodide, heating the gel so formed until the gel liquefies and remains a liquid on cooling and until the pH of the said liquid becomes substantially constant at at least about 3.5.

2. In making a zirconyl and aluminum complex, the process which comprises heating zirconyl chloride with an aqueous solution of aluminum chloride and with aluminum metal in proportions to provide 2–10 atoms of total aluminum per mole of zirconyl chloride, continuing the heating until the pH rises to at at least about 3.5, and then cooling the product.

3. In making a zirconyl and aluminum complex, the process which comprises heating zirconyl chloride with an aqueous solution of aluminum chloride and with aluminum metal in proportions to provide 2–10 atoms of total aluminum per mole of zirconyl chloride, continuing the heating until the pH becomes substantially constant, and then cooling the product.

4. A zirconyl and aluminum complex of proportions of components represented by the empirical formula $$ZrOCl_2 \cdot Al_n(OH)_{n(2-2.5)}Cl_{n(0.5-1)}$$

in which $n$ is a number within the range 2–10 and the numbers of OH groups and Cl atoms are selected, within the ranges stated, to make the sum thereof $3n$, the complex being the reaction product of the said components in aqueous solution brought to a substantially constant pH.

5. The complex of claim 4, the proportions of components being those represented approximately by the empirical formula $$ZrOCl_2 \cdot Al_8(OH)_{20}Cl_4$$

6. An astringent comprising the said complex of claim 4 and water, the complex being in solution in the water, the solution having a pH of approximately 3.5–3.8 and the solution being substantially stable in pH and viscosity on aging.

7. A zirconyl and aluminum complex of proportions of components represented by the empirical formula $$ZrOCl_2 \cdot Al_n(OH)_{n(2-2.5)}Cl_{n(0.5-1)}$$

in which $n$ is a number within the range 2–10 and the numbers of OH groups and Cl atoms are selected, within the ranges stated, to make the sum thereof $3n$, the complex being the reaction product of the said components in aqueous solution brought to a substantially constant pH by heating.

8. A zirconyl and aluminum complex of proportions of components represented by the empirical formula $$ZrOCl_2 \cdot Al_n(OH)_{n(2-2.5)}Cl_{n(0.5-1)}$$

in which $n$ is a number within the range 2–10 and the numbers of OH groups and Cl atoms are selected, within the ranges stated, to make the sum thereof $3n$, the complex being the reaction product of the said components in aqueous solution brought to a substantially constant pH of at least 3.5.

9. A zirconyl and aluminum complex of proportions of components represented by the empirical formula $$ZrOCl_2 \cdot Al_n(OH)_{n(2-2.5)}Cl_{n(0.5-1)}$$

in which $n$ is a number within the range 2–10 and the numbers of OH groups and Cl atoms are selected, within the ranges stated, to make the sum thereof $3n$, the complex being the reaction product of the said components in aqueous solution brought to a substantially constant pH of at least 3.5 by heating.

References Cited in the file of this patent

UNITED STATES PATENTS

| | | |
|---|---|---|
| 2,196,016 | Huehn | Apr. 2, 1940 |
| 2,507,128 | Wainer | May 9, 1950 |
| 2,571,030 | Govett | Oct. 9, 1951 |

(Other references on following page)

UNITED STATES PATENTS

| | | |
|---|---|---|
| 2,734,847 | Berger | Feb. 14, 1956 |
| 2,814,584 | Daley | Nov. 26, 1957 |
| 2,814,585 | Daley | Nov. 26, 1957 |

OTHER REFERENCES

Govett: The Am. Perfumer and Ess. Oil Rev., April 1947, pp. 365–368.

Blumenthal: J. of the Soc. of Cos. Chemists, vol. 4, No. 2, pp. 69–75.

Thomas et al.: J. Am. Chem. Soc., vol. 54, March 1932, pp. 842–855.

Thomas et al.: J. Am. Chem. Soc., vol. 57, October 1935, pp. 1825–1828.

Merck Index, Merck and Co., Rahway, N.J., 1940, 5th ed., p. 591.